United States Patent

Florance et al.

[15] 3,641,393

[45] Feb. 8, 1972

[54] AUTOMATIC GROUND FAULT CIRCUIT INTERRUPTER

[72] Inventors: Douglas A. Florance, 1110 Hillside Drive, Vestal, N.Y. 13850; Lloyd P. Nordholm, 1515 W. Addorra Drive, Phoenix, Ariz. 85029; Stephen Foldes, 5 Riverside Drive, Binghamton, N.Y. 13905

[22] Filed: Jan. 25, 1971

[21] Appl. No.: 109,505

Related U.S. Application Data

[63] Continuation-in-part of Ser. No. 828,836, May 29, 1969, Pat. No. 3,558,980.

[52] U.S. Cl............................317/22, 317/18 D, 317/27 R, 317/33 SC, 317/38, 317/54, 317/135 R, 323/9
[51] Int. Cl.........................................H02h 3/28, H02h 7/26
[58] Field of Search.....................317/18 D, 27 R, 33 SC, 38, 317/54, 22, 135 R, 148.5 B; 323/9

[56] References Cited

UNITED STATES PATENTS

| | | | |
|---|---|---|---|
| 3,252,052 | 5/1966 | Nash | 317/18 D |
| 3,296,493 | 1/1967 | Whittaker et al. | 317/18 D |
| 3,376,477 | 4/1968 | Weinger | 317/27 R |
| 3,558,980 | 1/1971 | Florance et al. | 317/18 D |

*Primary Examiner*—James D. Trammell
*Attorney*—Frederick E. Bartholy

[57] ABSTRACT

A power distribution system with automatic ground fault and overload protection is described. In series with the conductors of a powerline are placed current coils representing primary windings of a transformer connected in cancelling phase relation. The secondary windings of a transformer connected in cancelling phase relation. The secondary windings are energized by virtue of a predetermined reference current through one of the primary windings. The induced electromotive force due to reference current is cancelled by a ground fault leakage current. Switching means are actuated, effecting disconnection of the live conductor in accordance with excitation of the secondary windings.

3 Claims, 5 Drawing Figures

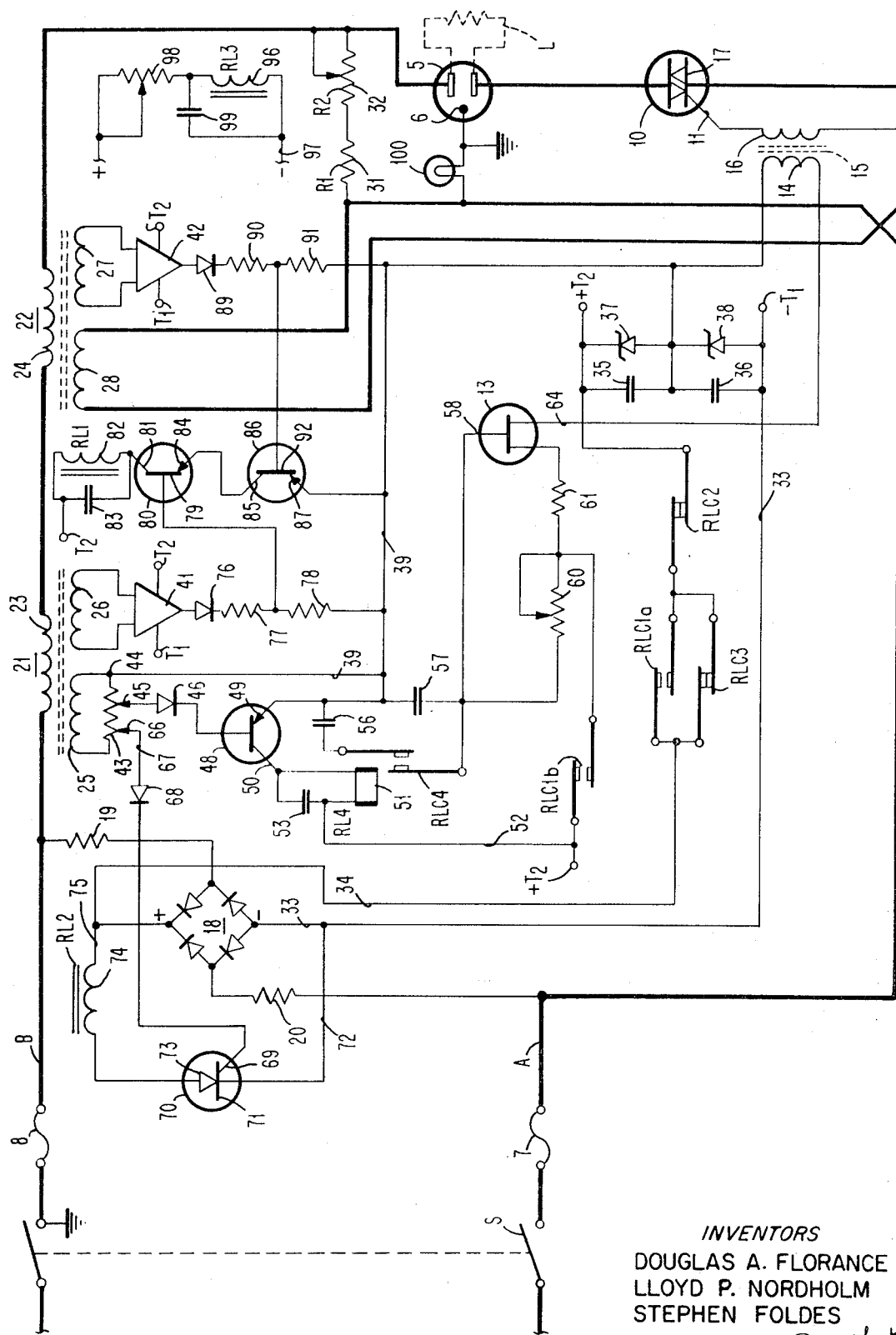

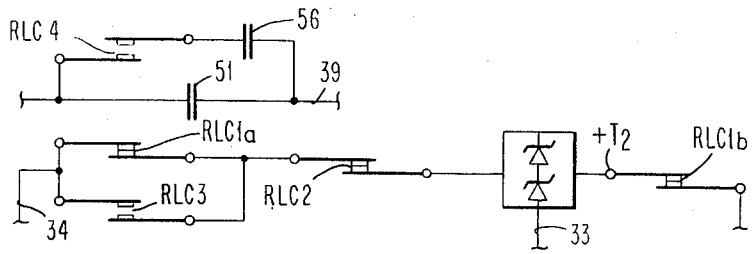
FIG_2a
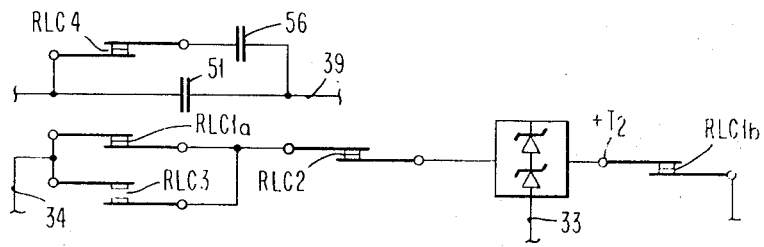
FIG_2b
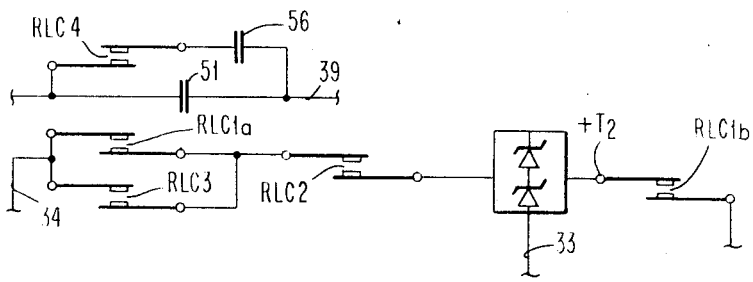
FIG_2c
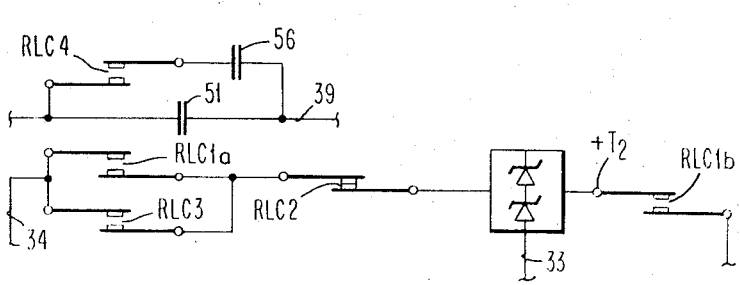
FIG_2d
INVENTORS
DOUGLAS A. FLORANCE
LLOYD P. NORDHOLM
STEPHEN FOLDES
BY Frederick E Bartley
ATTORNEY

AUTOMATIC GROUND FAULT CIRCUIT INTERRUPTER

This is a continuation-in-part of my pending U.S. application, Ser. No. 828,836 filed May 29, 1969, now Pat. No. 3,558,980.

This invention relates to power distribution systems and, more particularly, to protection of feeder lines against ground faults and overload.

For the safety of electrical installations, it is mandatory that a ground return circuit be provided so that apparatus having conductive casings may be effectively placed at ground potential. Serious electrical shocks may occur if the body of a person handling electrical appliances completes the circuit to ground, in case the device has a poor ground connection and it is in contact with the live wire or "hot line" of the electrical system.

A defect in a grounded device which permits current flow from the hot line through the metallic housing thereof may be of such relatively high resistance as to act as an additional load without causing normal overload protective devices, such as fuses or circuit breakers, to function. Such high-resistance ground faults are particularly dangerous in that after a given time the power dissipated therein may cause sufficient heat to result in a fire.

Various devices and circuits for the detection and elimination of ground faults have been proposed—some sensing the effective impedance of the system ground and others operating on an imbalance which ground fault currents may produce. The disadvantage of such detectors lies in the sensitivity required for the detection of small currents which makes them unstable at times, causing fault indications even under normal operating conditions. A reactance coil connected between the system neutral and ground, so proportioned to the system capacitance that the lagging current through the coil at time of single conductor line-to-ground fault is equal in magnitude and opposite in phase to the charging current at the fault, has also been employed. This is generally known as the "Petersen" coil. However, it cannot clear phase-to-phase faults.

Overload protection in the form of circuit breakers or fuses are generally satisfactory for sudden disruption of the current. Such devices have an operational threshold and will not function when an overload condition is such as to be below the operational level.

Accordingly, it is a primary object of this invention to provide a control circuit capable of detecting defective conditions in a distribution system due to current caused by a conductive path between ground and the live wire.

It is another object of the invention to provide a light overload warning signal and an overload shutoff beyond a predetermined current level.

It is a particular feature of the invention that the circuit is automatic in operation, assuring continuous maintenance-free service.

It is a particular advantage of the invention that the circuit in accordance therewith is capable of detecting currents either due to overload or such which bypass the neutral conductor and will, under such conditions, automatically disconnect the system from the load.

Other objects, features and advantages will be apparent from the following description of the invention, defined in particularity in the appended claims, and taken in connection with the accompanying drawings, in which:

FIG. 1 is a schematic circuit diagram of the basic ground fault detector and overload circuit protector; and FIG. 2a, b, c, and d, is a schematic circuit in detail of the position of the contact elements of the functional relays in a series of operating stages.

Referring to the drawings, the schematic circuit shown in FIG. 1 depicts a complete installation for automatic ground fault and overload protection of a power distribution system consisting of conductors A and B which supply the load L. The latter is shown connected, by way of example, between contacts of a terminal receptacle 5 of the type having a grounded contact 6. It is to be understood that the supply line A and B may be connected to several of such receptacles or, if so desired, directly to various loads. While only a pair of conductors is shown for the sake of simplicity of illustration, it is to be understood that a separate ground wire is generally used in practice. This is indicated by the conventional grounding symbol.

At the infeed end, one of the supply conductors is grounded. This is shown for conductor B. Conductor A may now be considered the "hot" line. At the infeed end, the switch S represents the main circuit interrupter, generally located in a distribution box. Fuses 7 and 8 are provided in series with the lines.

The overload and ground fault detection system of the present invention may be divided into the following main functional component assemblies:

I. A gated semiconductor 10 is of the SCR type and provides conductivity to the load at each half-cycle of the alternating current upon proper application of bias to the common control electrode 11. A dual semiconductor of this type is known in the art as a triac.

II. An oscillator 13 which produces the gate control voltage is preferably of the unijunction relaxation type, energizing the primary winding 14 of the transformer 15, the secondary winding 16 of which connects between the control electrode 11 and cathodes 17 of the triac 10.

III. A DC power supply in the form of a full-wave rectifier assembly 18 which is connected at the infeed end through series resistors 18 and 19 between the conductors A and B.

IV. Transformers 21 and 22 having primary windings 23 and 24, respectively, connected in series in the supply conductor B. Transformer 21 has secondary windings 25 and 26 and transformer 22 has secondary windings 27 and 28. The latter is placed in series with the supply conductor A in such phase relation as to cancel any induced voltage in the winding 27 due solely to normal load current. Windings 23, 24, and 28 may be considered as current coils inasmuch as the load current must flow through these windings.

V. Reference current resistance elements 31 and 32 which are connected between the supply line A and B at a point bypassing the series current coil 28. It is to be noted that by virtue of the placement of resistors 31 and 32, a reference current of predetermined value is caused to flow in the primary windings 22 and 23 in order to induce a voltage in the associated secondary windings.

VI. A latching relay RL3 and circuit therefor, the function of which will be explained later.

The circuit will now be described in detail. The negative side of the rectifier 18 connects, by means of conductor 33 to terminal $-T_1$ and the positive side connects, by means of conductor 34, through a series of contact elements RLC1a, RLC2, and RLC3 to terminal $+T_2$. Filter condensers 35 and 36 are connected in series between these terminals, each filter being bridged by Zener diodes 37 and 38, respectively. Conductor 39 connects to the junction point of condensers 35, 36, and Zener diodes 37, 38, and is the common return path. This assembly serves as a regulated DC power supply.

The secondary winding 25 of transformer 21 terminates in a dual rider potentiometer 43. One terminal of potentiometer 43 connects at 44 to the common conductor 39. The rider 45 connects by means of the isolation diode 46 to the base of transistor 48, the collector 49 of which connects to the common conductor 39. The emitter 50 is connected to one terminal of the winding 51 of the relay RL4, the other terminal being connected by means of conductor 52 to terminal $+T_2$ of the power supply. Condenser 53 shunts the winding 51. When closed, the contacts RLC4 of the relay RL4 place the condenser 56 in parallel with the condenser 57. The latter is the frequency-determining element of the oscillator 13 and is connected to the common conductor 39 on one side and to the emitter electrode 58 on the other side.

Variable resistor 60 connects to the emitter 58 and to the junction point of resistor 61 which terminates at the base 1 of the unijunction transistor 13 and the contacts RLC1b. Base 2 of the transistor 13 connects by means of conductor 64 to one terminal of the primary winding 14 of the transformer 15, the other terminal being connected to the common conductor 39. This completes the circuit of the oscillator 13, except for applying DC potential to the junction point of resistors 60 and 61. This is effected by means of contacts RLC1b of the relay RL1 which completes the circuit to +T₂ of the power supply.

Returning to the winding 25 of transformer 21, it is seen that the rider 66 of the potentiometer 43 connects by means of conductor 67 and isolation diode 68 to the gate electrode 69 of SCR 70. The cathode 71 of SCR 70 connects by means of conductor 72 to the negative terminal of rectifier 18. The anode 73 thereof connects to one terminal of the winding 74 of the relay RL2, the other terminal of which connects by means of conductor 75 to the positive side of rectifier 18. It is to be noted that this circuit is always energized when the switch S is closed to the feeders A and B of the power distribution system.

Reference should now be had to operational amplifiers 41 and 42. The signal input to the former is derived from the secondary winding 26 of the transformer 21 and signal input to the latter from secondary winding 27 of transformer 22.

As indicated by the terminal connections, direct current supply for energizing the amplifiers is obtained from terminals T₁ and T₂ of the power supply. The output of amplifier 41 is rectified by the diode 76 and feeds resistors 77 and 78 connected in series, terminating at the common conductor 39. The junction point of resistors 77 and 78 connects to the base 79 of transistor 80. The emitter 81 thereof connects to one terminal of the winding 82 of the relay RL1, the other terminal of which, as indicated, connects to T₂ of the power supply. Condenser 83 is placed across the winding 82. The collector 84 of transistor 80 connects to the emitter 85 of transistor 86, the collector 87 being connected to the common conductor 39. The output of the operational amplifier 42 is similarly arranged, being rectified by the diode 89 feeding resistors 90 and 91, connected in series, terminating at the common conductor 39. The junction point of resistors 90 and 91 connects to the base 92 of transistor 86.

The latching relay circuit comprises the winding 96 of relay RL3, having one terminal connected to conductor 97 which terminates, as indicated, at the negative side of rectifier 18. The other terminal of the winding 96 connects to a variable resistance 98 which, as symbolically indicated, terminates at the positive side of rectifier 18. Capacitor 99 shunts the winding 96 of relay RL3.

The pilot light 100 connects to the infeed side of supply conductor A and the ground return. The purpose of this is to indicate that the ground return of the receptacle is properly connected.

Referring to the operation, in the circuit shown in FIG. 1, the main circuit interrupter switch S is in open position so that no power is delivered to the line. Consequently, the rectifier assembly 18 delivers no voltage. The contacts of the functional relays RL1, RL2, RL3, and RL4 are in the position as shown, namely, RLC1a, RLC1b, and RLC4 are open; RLC2 and RLC3 are closed. These are the contact positions when the relays are not energized.

When switch S is closed, power is delivered to the feeders A and B and to rectifier 18 and thus to the latching relay RL3, since the circuit thereof is connected directly to the terminals of the rectifier assembly. Upon closing of switch S, voltage also appears at terminals +T₂ and —T₁ of the power supply, in view of the fact that the circuit to the rectifier assembly 18 is completed through closed contacts RLC3 and RLC2.

RL3 is a delay relay by virtue of the time constant effected by resistor 98 and capacitor 99 so that, upon energizing, it will hold contacts RLC3 closed for a predetermined time period sufficient for the power supply to function and deliver voltage to the terminals of operational amplifiers 41 and 42. As soon as these are in operation, the reference current path provided by resistors R1 and R2 establishes a predetermined current flow sufficient to provide signal input to amplifiers 41 and 42 from the secondary windings 26 and 27, respectively. The output voltages of the amplifier are additive and forward bias the transistors 80 and 86 so that current flow is established in the winding 82 of relay RL1. The latter closes contacts RLC1a and RLC1b.

After the elapsed time, the winding 96 of RL3 becomes fully energized, opening contacts RLC3 and holding them in open position. This condition is shown in FIG. 2a. It is seen that although contacts RLC3 are open, the current path is now bridged by contacts RLC1a which are held closed by virtue of the operation of amplifiers 41 and 42 receiving signal energy from windings 26 and 27. By adjusting the value of R₂, the magnitude of the reference current and thus the signal input voltage to amplifiers 41 and 42 may be adjusted to the required level for operation. In practice, a few milliamperes of current may be sufficient for operative response of the amplifiers—a negligible load in a power installation.

Let us first consider overload conditions. At a small overload which is not due to any ground fault but to the fact that the load imposed upon the line is somewhat heavier than permitted by its design parameters, sufficient voltage drop will appear at rider 45 of resistor 43 to forward bias transistor 48 so that the winding 51 of RL4 is energized, closing contacts RLC4. This places condenser 56 in parallel with condenser 57 in the frequency determining circuit of oscillator 13. The control voltage produced by the oscillator will now have a frequency much lower than required for normal operation, resulting in an intermittent pulsed signal delivered to the triac 10. This establishes conductivity at such a slow recurrent rate as to manifest itself by frequent interruption of load current. It is, in fact, a signal that there is some overload in the distribution system which requires correction. The position of the relay contact elements in this case is indicated in FIG. 2b. The difference between this and FIG. 2a is simply that RLC4 is now closed.

When the overload is removed, RL4 becomes deenergized, opening contacts RLC4, thereby disconnecting the shunt capacitor 56. The oscillator 13 returns to operation at or above the powerline frequency, depending on the design thereof, and conducting of the triac 10 at the normal rate ensues.

In case of a massive overload which would be detrimental to the system, sufficient voltage is delivered across potentiometer 43 at rider 66 to supply control voltage SCR73. When the latter fires, relay RL2 is energized, opening contact RLC2. This disconnects the power supply from rectifier 18, removing operating voltages from amplifiers 41 and 42 so that relay RL1 is deenergized, opening contacts RLC1a and RLC1b. Oscillator 13 receives no operating potential, thus current is interrupted to the load by virtue of the nonconductivity of triac 10. This condition is shown in FIG. 2c. All contacts of the relays are now open. The power is disconnected from the load L. The circuit cannot be energized again until the main switch S is opened, disconnecting power to the rectifier assembly 18. As soon as this occurs, the relay RL3 becomes deenergized, closing contacts RLC3. Upon reclosing the switch S, contacts RLC3 remain closed for the time interval necessary to allow the power supply to furnish operating voltage to amplifiers 41 and 42. After this sequence of operation, should there still be an overload on the line, SCR 73 will fire again, opening contact RLC2, breaking the circuit to the power supply. Not until the overload is cleared can the circuit be reestablished for normal operation.

Let us now consider the sequence of operation upon a ground fault in the power distribution system. Such a fault occurs when a current conductive path is established between the live conductor at the load end and the ground conductor 6. This may occur due to a fault in the load, e.g., a grounded appliance such as a motor frame which permits leakage to ground from the hot line. The current so established, bypasses the secondary windings 23 and 24, and increases the current in the winding 28 of transformer 22.

This additional current being of opposite phase, cancels the reference current so that the induced voltage in the winding 27 is counteracted, eliminating signal input to the amplifier 42. At no signal to amplifier 42, transistor 86 ceases to conduct so that current in the winding 82 of RL1 ceases, causing contacts RLC1a and RLC1b to open, disconnecting the rectifier 18 from the power supply. No operating voltage will appear between terminals $+T_2$ and $-T_1$ and amplifiers 41 and 42 thus become deenergized. Oscillator 13 ceases to function by virtue of open contacts RLC1b so that triac 10 becomes nonconductive and the load L is thus disconnected from the supply line. This condition is indicated in the switch position shown in FIG. 2d. Switches RLC1a and RLC1b are open; contacts RLC3—previously opened—remain in this position; and only RLC2 is closed. In order to reestablish operating conditions, the main switch S must be opened, so as to deenergize latching relay RLC3, and reclosed as outlined in connection with the description of the massive overload condition.

The invention in its broader aspects is not limited to the specific embodiments herein shown and described but changes may be made within the scope of the accompanying claims without departing from the principles of the invention and without sacrificing its chief advantages.

What is claimed is:

1. An alternating current power distribution system including at least two load current carrying conductors receiving power from a supply circuit at the feed end and delivering power at the delivery end, one of said conductors, termed the neutral, being grounded at said feed end and the other conductor, termed the live conductor, being above ground potential; means for protecting said live conductor from current leakage to ground due to a fault creating a conductive path which bypasses said neutral conductor comprising:
    a. first and second current coils connected in series between the infeed and the delivery end of said neutral conductor;
    b. a plurality of windings inductively coupled to said coils whereby upon current flow a voltage is induced in said windings;
    c. a current coil in series with said live conductor and inductively coupled to one of said current coils in current cancelling phase relation;
    d. resistance means establishing a reference current flow in said series connected current coils, thereby establishing an induced voltage in said windings;
    e. means additively combining the reference voltage of one winding of said first current coil and the reference voltage of one winding of said second current coil for actuation of circuit closing means;
    f. a power supply energized at the infeed end of said line;
    g. gated semiconductors in series between said lines and the load supplied therefrom;
    h. an oscillator energized from said power supply for controlling the gating of said semiconductors at a predetermined frequency, said circuit closing means being connected between said power supply and said oscillator, whereby, upon current flow in said live conductor bypassing said neutral conductor, said reference voltage is cancelled in the secondary winding of said second current coil, releasing the actuation of said circuit closing means, thereby disconnecting the power supply from said oscillators and resulting in nonconductivity of said semiconductors.

2. An alternating current power distribution system in accordance with claim 1 wherein one of said windings supplies operating potential to a relay due to a load current of predetermined magnitude for disconnecting said power supply, thereby rendering said semiconductors nonconductive and at another load current of lesser magnitude for the energizing of a relay having contacts introducing a frequency determining element in the circuit of said oscillator, resulting in a recurrent application of power to the load at observable intervals as a warning signal indicating the overload condition.

3. An alternating current power distribution system in accordance with claim 1 wherein a latching relay is provided having contacts connected in parallel with said circuit closing means, said relay being operable upon energizing of said power distribution system for shunting said circuit closing means for a predetermined time interval.

* * * * *